US 8,279,648 B2

(12) United States Patent
Dooley

(10) Patent No.: US 8,279,648 B2
(45) Date of Patent: Oct. 2, 2012

(54) POWER INVERTER AND METHOD

(75) Inventor: Kevin Allan Dooley, Mississauga (CA)

(73) Assignee: Pratt & Whitney Canada Corp., Longueuil (CA)

(*) Notice: Subject to any disclaimer, the term of this patent is extended or adjusted under 35 U.S.C. 154(b) by 337 days.

(21) Appl. No.: 12/051,983

(22) Filed: Mar. 20, 2008

(65) Prior Publication Data

US 2009/0237968 A1    Sep. 24, 2009

(51) Int. Cl.
    H02M 7/44 (2006.01)
(52) U.S. Cl. .................... 363/98; 363/131; 363/132
(58) Field of Classification Search ............. 363/15–18, 363/20, 55, 56.01, 57, 95, 97, 98, 109, 131–133, 363/136
    See application file for complete search history.

(56) References Cited

U.S. PATENT DOCUMENTS

| 2,886,762 | A |   | 6/1942  | Brainard        |        |
|-----------|---|---|---------|-----------------|--------|
| 2,504,768 | A |   | 4/1950  | Watson et al.   |        |
| 3,648,150 | A | * | 3/1972  | Kernick et al.  | 363/41 |
| 3,678,352 | A |   | 7/1972  | Bedford         |        |
| 3,710,226 | A |   | 1/1973  | Seike           |        |
| 3,768,002 | A |   | 10/1973 | Drexler et al.  |        |
| 4,039,910 | A |   | 8/1977  | Chirgwin        |        |
| 4,156,836 | A |   | 5/1979  | Wiley           |        |
| 4,239,978 | A |   | 12/1980 | Kofink          |        |
| 4,339,791 | A | * | 7/1982  | Mitchell        | 363/41 |
| 4,454,464 | A |   | 6/1984  | Stroud          |        |
| 4,489,265 | A |   | 12/1984 | Kuznetsov       |        |
| 4,492,902 | A |   | 1/1985  | Ficken et al.   |        |
| 4,559,487 | A |   | 12/1985 | Sims et al.     |        |
| 4,788,486 | A |   | 11/1988 | Mashino et al.  |        |
| 4,827,151 | A | * | 5/1989  | Okado           | 307/66 |
| 4,827,393 | A |   | 5/1989  | Clark           |        |
| 4,829,228 | A |   | 5/1989  | Buetemeister    |        |
| 5,053,937 | A |   | 10/1991 | Blockl          |        |
| 5,057,698 | A |   | 10/1991 | Widener et al.  |        |
| 5,097,165 | A |   | 3/1992  | Mashino et al.  |        |
| 5,233,229 | A |   | 8/1993  | Kohl et al.     |        |
| 5,254,936 | A |   | 10/1993 | Leaf et al.     |        |
| 5,397,975 | A |   | 3/1995  | Syverson        |        |
| 5,444,355 | A |   | 8/1995  | Kaneyuki        |        |
| 5,502,368 | A |   | 3/1996  | Syverson et al. |        |
| 5,625,539 | A |   | 4/1997  | Nakata          |        |
| 5,631,544 | A |   | 5/1997  | Syverson et al. |        |
| 5,693,995 | A |   | 12/1997 | Syverson et al. |        |

(Continued)

FOREIGN PATENT DOCUMENTS

CA    2051626    8/1991

(Continued)

OTHER PUBLICATIONS

International Search Report, PCT/CA2007/001585, Dec. 27, 2007.

(Continued)

Primary Examiner — Nguyen Tran
(74) Attorney, Agent, or Firm — Norton Rose Canada LLP

(57) ABSTRACT

An apparatus and method for converting an input signal to an output AC signal in which the input voltage signal is inverted and modulated to provide an intermediate AC signal having twice the desired output frequency. The intermediate signal is then full-wave rectified and then the polarity of the rectified signal is switched every second cycle to produce the output AC signal of a desired frequency and voltage.

17 Claims, 4 Drawing Sheets

U.S. PATENT DOCUMENTS

| | | | |
|---|---|---|---|
| 5,710,471 A | 1/1998 | Syverson et al. | |
| 5,723,972 A | 3/1998 | Bartol et al. | |
| 5,731,688 A | 3/1998 | Thomson | |
| 5,734,255 A | 3/1998 | Thompson et al. | |
| 5,739,676 A | 4/1998 | Judge et al. | |
| 5,747,909 A | 5/1998 | Syverson et al. | |
| 5,753,989 A | 5/1998 | Syverson et al. | |
| 5,754,033 A | 5/1998 | Thomson | |
| 5,874,797 A | 2/1999 | Pinkerton | |
| 5,903,116 A | 5/1999 | Geis et al. | |
| 5,930,105 A | 7/1999 | Pitel et al. | |
| 5,942,818 A | 8/1999 | Satoh et al. | |
| 5,953,491 A | 9/1999 | Sears et al. | |
| 5,955,809 A | 9/1999 | Shah | |
| 5,973,481 A | 10/1999 | Thompson et al. | |
| 6,031,294 A | 2/2000 | Geis et al. | |
| 6,218,813 B1 | 4/2001 | Davis | |
| 6,252,751 B1 | 6/2001 | Rozman | |
| 6,265,786 B1 | 7/2001 | Bosley et al. | |
| 6,281,664 B1 | 8/2001 | Nakamura et al. | |
| 6,297,977 B1 | 10/2001 | Huggett et al. | |
| 6,323,625 B1 | 11/2001 | Bhargava | |
| 6,325,142 B1 | 12/2001 | Bosley et al. | |
| 6,356,471 B1 | 3/2002 | Fang | |
| 6,437,529 B1 | 8/2002 | Brown | |
| 6,487,096 B1 | 11/2002 | Gilbreth et al. | |
| 6,487,099 B1 | 11/2002 | Perkins et al. | |
| 6,504,261 B2 | 1/2003 | Fogarty et al. | |
| 6,583,995 B2 | 6/2003 | Kalman et al. | |
| 6,713,898 B2 * | 3/2004 | Wagoner et al. | 307/151 |
| 6,781,331 B2 | 8/2004 | Mokri et al. | |
| 6,838,860 B2 | 1/2005 | Huggett et al. | |
| 6,839,249 B2 | 1/2005 | Kalman et al. | |
| 6,870,279 B2 | 3/2005 | Gilbreth et al. | |
| 6,936,948 B2 | 8/2005 | Bell et al. | |
| 6,965,183 B2 | 11/2005 | Dooley | |
| 6,995,993 B2 | 2/2006 | Sarlioglu et al. | |
| 7,002,317 B2 | 2/2006 | Ganev | |
| 7,007,179 B2 | 2/2006 | Mares et al. | |
| 7,019,495 B2 | 3/2006 | Patterson | |
| 7,061,149 B2 | 6/2006 | Crane | |
| 7,262,539 B2 | 8/2007 | Dooley | |
| 7,288,923 B1 | 10/2007 | Dooley et al. | |
| 7,312,550 B2 | 12/2007 | Dooley | |
| 7,439,713 B2 | 10/2008 | Dooley | |
| 7,529,106 B2 * | 5/2009 | Hikosaka | 363/44 |
| 2001/0045779 A1 * | 11/2001 | Lee et al. | 307/66 |
| 2002/0047455 A1 | 4/2002 | Dhyanchand et al. | |
| 2002/0084705 A1 | 7/2002 | Kawamura | |
| 2002/0190695 A1 | 12/2002 | Wall et al. | |
| 2002/0198648 A1 | 12/2002 | Gilbreth et al. | |
| 2004/0239202 A1 | 12/2004 | Dooley | |
| 2004/0239203 A1 | 12/2004 | Bell et al. | |
| 2005/0046396 A1 | 3/2005 | Patterson | |
| 2005/0099827 A1 * | 5/2005 | Sase et al. | 363/16 |
| 2005/0146307 A1 | 7/2005 | Dooley et al. | |
| 2005/0212466 A1 | 9/2005 | Rozman et al. | |
| 2005/0242785 A1 | 11/2005 | Dooley | |
| 2006/0061213 A1 | 3/2006 | Michalko | |
| 2006/0113967 A1 | 6/2006 | Dooley | |
| 2006/0226721 A1 | 10/2006 | Dooley et al. | |
| 2006/0244332 A1 | 11/2006 | Wyremba | |
| 2008/0019062 A1 | 1/2008 | Dooley | |
| 2008/0067982 A1 | 3/2008 | Dooley | |
| 2009/0008936 A1 | 1/2009 | Dooley | |
| 2009/0091282 A1 | 4/2009 | Dooley | |

FOREIGN PATENT DOCUMENTS

| | | |
|---|---|---|
| DE | 2253739 A1 | 5/1974 |
| EP | 0010900 A | 5/1980 |
| EP | 1764908 | 3/2007 |
| GB | 1384156 | 2/1975 |
| JP | 55061265 | 10/1978 |
| JP | 61251481 | 4/1985 |
| JP | 2003341991 | 5/1999 |
| WO | 03028202 | 4/2003 |
| WO | 2004068674 A2 | 8/2004 |
| WO | 2004068674 A3 | 8/2004 |
| WO | 2005010630 | 2/2005 |
| WO | 2005025044 | 3/2005 |

OTHER PUBLICATIONS

European Search Report, EP07253722, Dec. 21, 2007.

Canadian Intellectual Property Office; Examiner's Requisition dated Jun. 10, 2010.

Response to Examiner's Requisition, amended p. 7 of description; amended claims dated Dec. 10, 2010.

Canadian Intellectual Property Office; Examiners Requisition dated May 6, 2011.

Canadian Intellectual Property Office; Response to Examiners Requisition, amended claims dated Nov. 4, 2011.

Canadian Intellectual Property Office; Voluntary Amendment dated Nov. 8, 2011.

* cited by examiner

POWER INVERTER AND METHOD

TECHNICAL FIELD

This application relates generally to electrical power generation and electrical power generation systems.

BACKGROUND

Limited cost-effective and weight-efficient means exist for conditioning high power electricity. Existing electronic high power commutation systems are heavy, bulky and expensive, and room for improvement therefore exists. Room for improvement also exists in power conditioning, generally.

SUMMARY

In one aspect, there is provided a method for conditioning a power signal, the method comprising the steps of: providing an input voltage signal; providing an input modulation signal; inverting the input signal to an intermediate AC signal, including a step of using the input modulation signal to impart a desired a voltage-time function to the intermediate AC signal; full-wave rectifying the intermediate AC signal to provide a rectified DC signal, the rectified DC signal having a periodic cyclical voltage-time function; reversing a polarity of the rectified DC signal every second cycle to thereby produce an output AC signal.

In another aspect, there is provided a power inverter having an output, the power inverter comprising: a push-pull switching circuit having a DC input and an intermediate AC output; a modulator for modulating the push-pull switching circuit; a full-wave rectifier having the intermediate AC output as an input and having a full-wave rectified DC output; a commutator having the full-wave rectified DC output as an input, the commutator being connected to the power inverter output; and a controller configured to cause the commutator to intermittently switch a polarity of the full-wave rectified DC output to thereby provide AC power to the power inverter output.

In another aspect, there is provided an inverter comprising: means for providing an input voltage signal; means for providing a modulation signal; means for inverting the input signal to an AC intermediate signal having a desired a voltage-time function; means for rectifying the intermediate AC signal to provide a rectified DC signal having a periodic cyclical voltage-time function; and means for reversing polarity of the rectified DC signal every other cycle to thereby produce an output AC signal.

BRIEF DESCRIPTION OF THE DRAWINGS

These and other aspects will become better understood with regard to the following description and accompanying drawings wherein.

DETAILED DESCRIPTION OF THE PREFERRED EMBODIMENT

Figure 1:
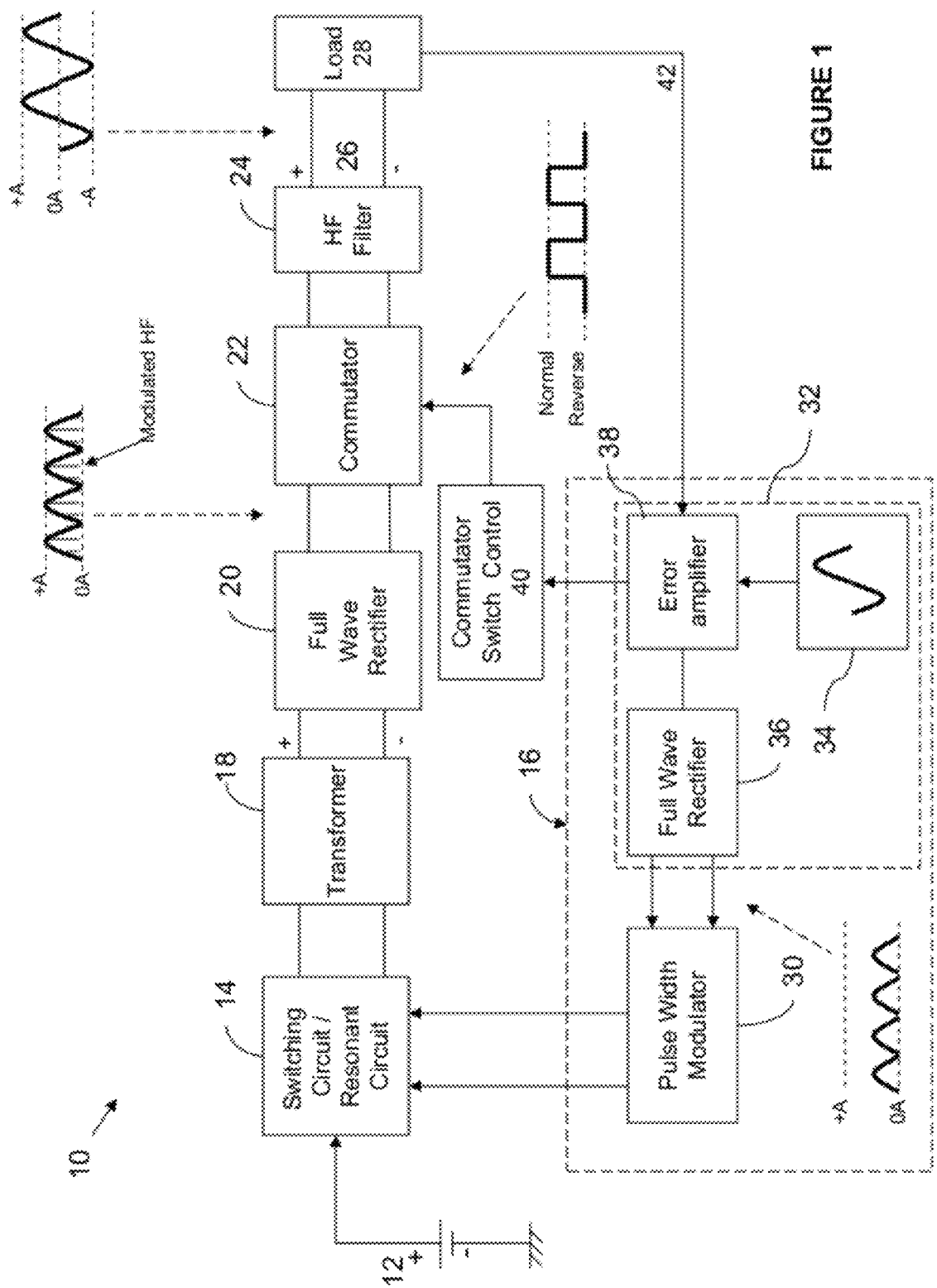
FIG. 1 is a schematic block diagram of one embodiment of a power inverter.

FIG. 1 shows an example of an inverter 10 as improved. In the example of FIG. 1, input direct current (DC) power source 12 is provided, for example from a rectified output of a generator connected to a gas turbine engine or from a battery, to drive a high frequency oscillator switching circuit 14. In this example, switching circuit 14 is a push/pull type and forms a part of a type of resonant converter, as described below. Switching control for the switching circuit 14 is provided by a pulse width modulation apparatus 16, described further below. Switching circuit 14 is connected to a high frequency (HF) transformer 18, which can be a torroidal type transformer or other suitable type of high frequency power transformer. The transformer 18 can provide a step-up voltage from a provided input level (e.g. 28V) to a desired output level (e.g. 115V). The DC source 12, switching circuit 14 resonant circuit components and transformer 18 assembly collectively provide a modulatable alternating current (AC) HF output. The use of a HF transformer for voltage step-up results in a compact light weight design, because of its very low winding turn count and high rate of change of flux, but any suitable transformer configuration may be used.

The transformer secondary side provides its output AC to a suitable full-wave rectifier 20 to rectify the AC signal to a DC signal. Silicon carbide type diode-based rectifiers have good high frequency and high voltage performance, however any suitable rectifier arrangement may be used. A suitable commutator circuit 22, controlled by a commutator switch control 40 as described below, connected to the output of rectifier 20 commutates the rectified DC wave into an AC output signal, such as by periodically reversing the polarity of the DC (as described further below) to provide an output AC signal at the desired output frequency. A generic H-bridge commutator circuit is suitable, but any other suitable commutation arrangement may be used, such as an SCR commutator.

Referring still to FIG. 1, the output of the commutator circuit 22 can be connected if desired to an HF filter 24 to remove undesired residual switching frequency components introduced by the high frequency switching, and thus eliminate any ripple remaining in the signal, before providing the signal at an output 26 to the load 28. Any suitable filtering approach, or lack thereof, may be employed.

As mentioned, inverter 10 includes modulation apparatus 16, which is connected for amplitude envelope modulation of switching circuit 14, as will be described in more detail below, and is connected to control commutator circuit 22 as well. Modulation apparatus 16 includes a pulse width modulator circuit 30 fed by a full-wave modulation generator 32, which may comprise a reference wave generator 34 and a full-wave rectifier 36 or a suitable digitally simulated equivalent. The reference wave generator 34 provides a reference signal representative of the selected waveform and frequency desired for output 26, which may be any suitable waveform and frequency, but for the purposes of this example is selected to be a relatively low frequency sine wave (say, 60 Hz or 400 Hz). In order to obtain a high fidelity output 26, the reference wave generator 34 output can be provided to one input of a differencing error amplifier 38, while an output current and or voltage feedback signal 42 is provided to the other input of the differencing error amplifier 38. The error amplifier 38 determines the difference or error (if any) between the reference and the output signal feedback and, from this, generates a suitable error waveform modified from the "pure" input wave provided by generator 34 which is provided to the pulse width modulator 30 in an action arranged to remove the "error" in the output voltage or current from the output 26 waveform. The action of the pulse width modulation arrangement is to provide a 0% to 100% variable HF input amplitude to the transformer circuit, which in turn becomes a 0% to 100% variable DC voltage output from the full wave rectifier circuit.

The commutation control 22 remains at a fixed frequency and period duty cycle of 50%, however the phase may be corrected from time to time as required, using the feedback signal 42. In this way, any nonlinearities in the inverter 10 can be minimized if not eliminated altogether.

Figure 2:
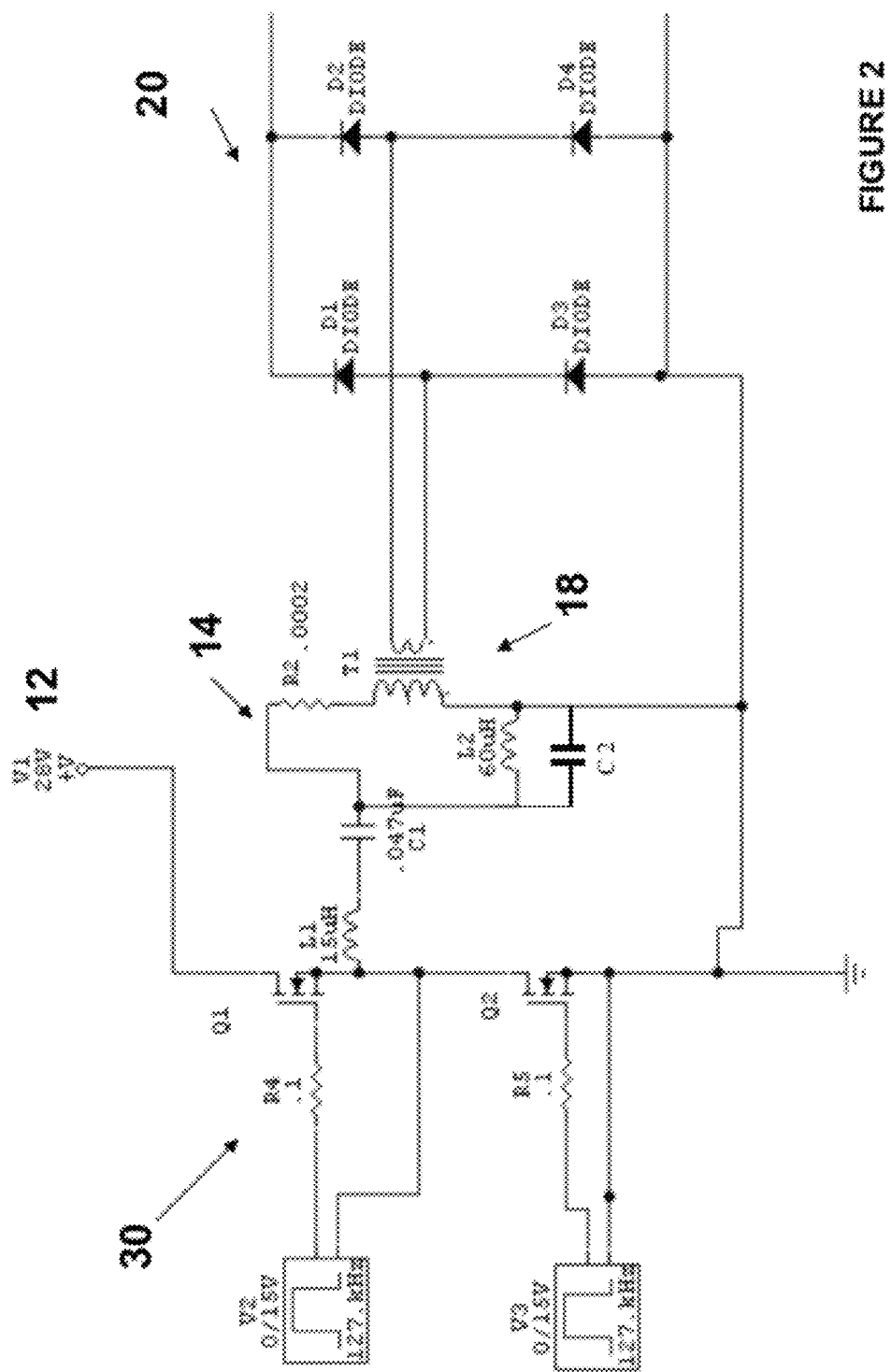
FIG. 2 is an example schematic block diagram of a portion of FIG. 1.

Referring now to FIG. 2, an example of switching circuit, transformer and pulse width modulator circuit 30 are shown in more detail. As mentioned, switching circuit 14 comprises a resonant circuit having inductors L1 and L2, and capacitors C1 & C2. These components in conjunction with the transformer T1 work together as a resonant converter. The example pulse width modulator circuit 30 includes HF voltage sources V1 and V2, resistors R4 and R5 respectively connected in series to transistors Q1 and Q2, and rectifier 20 (shown with diodes D1 to D4).

Figure 3:
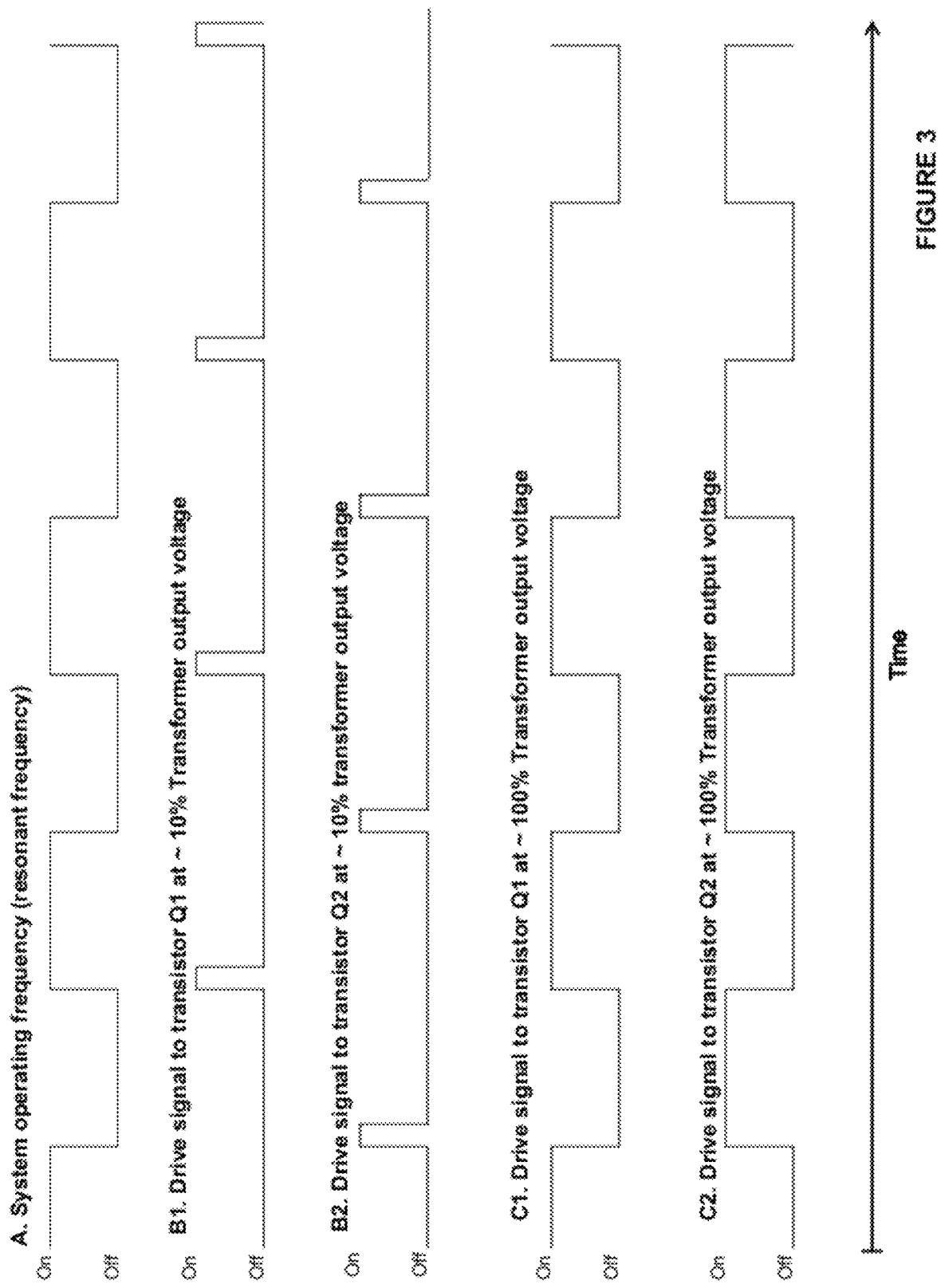
FIG. 3 is a schematic of a mode of operation of FIG. 2.

Referring to FIG. 3, an example switching arrangement is schematically depicted over time. Signal A represents the system operating frequency or clock signal, which is the HF switching frequency and is generated within the pulse width modulator circuit 30. Signals B1, B2 represent the drive signal provided to transistors Q1, Q2, respectively, to obtain approximately 10% of transformer output voltage, while signals C1, C2 represent the drive signal provided to transistors Q1, Q2, respectively, to obtain approximately 100% of transformer T1 output voltage. Within this envelope, the resonant circuit is driven and thus controlled to modulate the output of the transformer T1, according to a suitable control pattern, as described below.

The frequency of the switching may performed at the resonant frequency of the circuit made up from the circuit components supplied, however since the pulse width driving the power switching transistors is variable the input power to the resonant circuit, and as such the output voltage from the HF transformer is variable and is proportional to the pulse duration (relative to the frequency of operation). This effect may be used to modulate the output power of the present system, as described further below.

How the average AC amplitude is affected by the pulse width is somewhat similar to the effect a buck regulator has on the average DC content of the resultant pulse—except that in the present case the pulse width modulation causes the AC input to the transformer stage to be modulatable (i.e. of a variable amplitude), and therefore the resultant system output is fully variable power. The AC amplitude in the present approach is affected by the pulse width during switching, by affecting the Fourier content of the fundamental switching frequency (and its harmonics), and since the resonant circuitry substantially allows only the fundamental frequency current to flow in the transformer, the AC amplitude input to the transformer at the resonant frequency is thus variable by means of the pulse width modulation. Although resonant converters generally only provide a fixed output voltage at variable load currents, provided herein is a resonant converter that has a modulatable output voltage and which is capable of delivering a variable current to the load.

Figure 4:
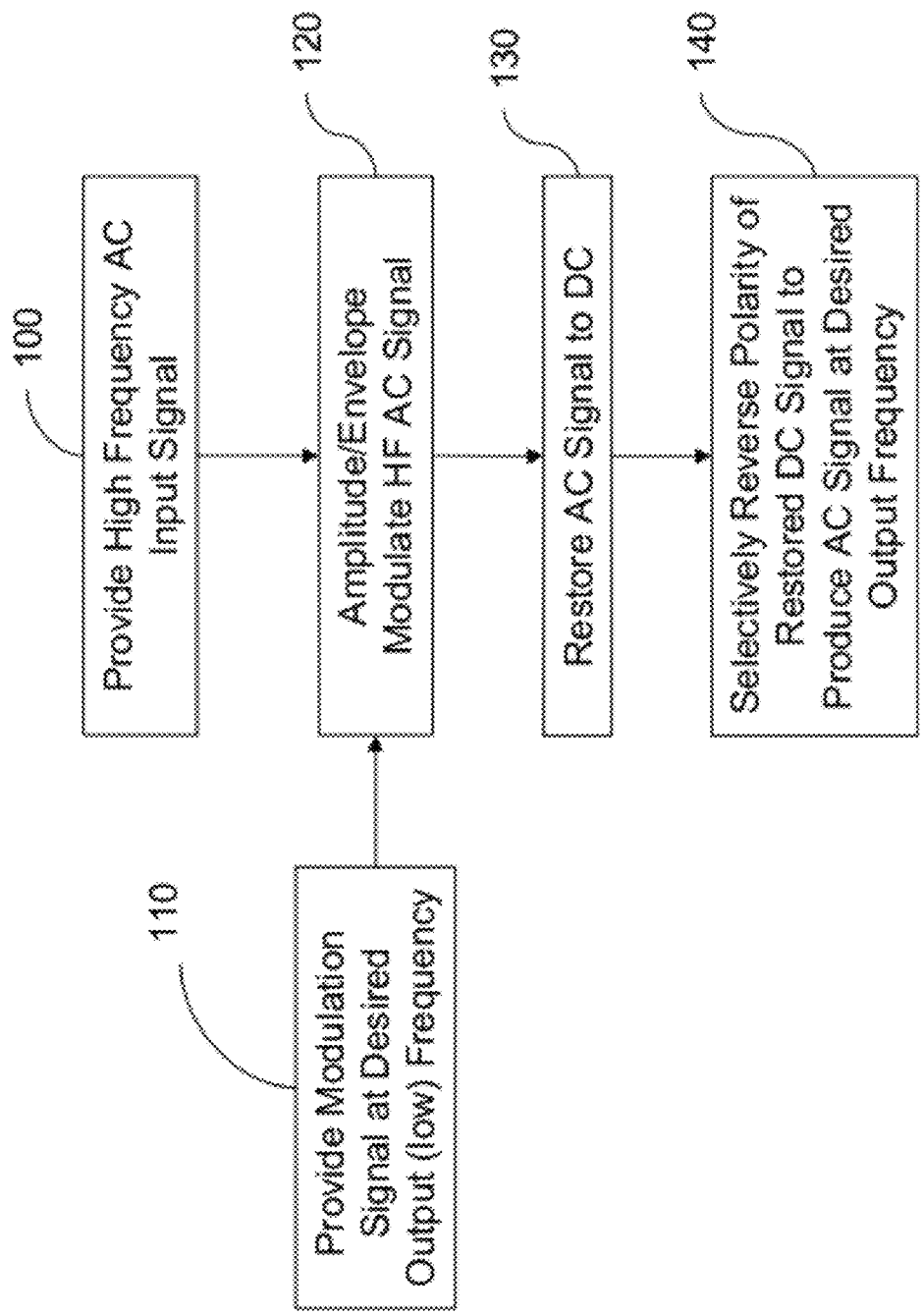
FIG. 4 is a flow chart showing an example of the steps of the method.

Referring to FIG. 1, in use, a high frequency AC signal (i.e. greater than 20 kHz) is provided by the switching circuit 14 switching the input DC signal at a relatively high frequency AC current (i.e. preferably greater than 100 kHz) to transformer 18 (reference step 100 in FIG. 4).

Pulse width modulator 30 of modulation apparatus 16 provides amplitude envelope modulation, as described above, of the HF AC signal provided by switching circuit 14, based on the selected reference low frequency modulation signal provided by the full-wave modulation generator 32, such that the modulated AC signal has an amplitude envelope which varies at twice the reference low frequency modulation signal (reference steps 110 and 120 in FIG. 4), and thus the HF filtered output of the full-wave rectifier 20 has a voltage-time function which appears as a full-wave rectified pattern at twice the desired frequency of AC output 26.

In this example, transformer 18 transforms the voltage of the modulated AC signal to a desired stepped-up output level. The stepped-up modulated AC signal is then rectified back to DC by rectifier 20, thus providing the mentioned voltage-time function which appears as a full-wave rectified pattern at twice the desired frequency of AC output 26 (reference step 130 in FIG. 4). The commutator circuit 22, with switch timing control 40 provided by modulation apparatus 16, commutates the rectified DC, based on the reference modulation frequency, such that the full-wave rectified modulated DC signal is converted, preferably in this case by switching polarity at every cycle, such that the average DC output signal becomes, in effect, an AC output voltage (reference step 140 in FIG. 4) alternating at the desired output frequency (say, 60 Hz or 400 Hz in this example), which is then filtered by HF filter 24 to remove unwanted residual components, leaving only the desired low frequency AC output signal 26 which may then be provided to a suitable load 28. The output voltage and current can be monitored by modulation apparatus 16, and compared to a reference signal in the modulation apparatus 16, as described above, such that instantaneous corrections are made as necessary to the modulation signal to maintain the desired output waveform.

As can be appreciated, the above-described arrangement allows one to provide a lightweight constant or variable speed, constant or variable frequency power conversion device. Output frequency may be varied simply by varying the modulation reference input. The frequency of the source high frequency AC remains at or near the resonant frequency, although the device may be operated to provide any desired output. The device therefore can offer a flexible fully variable output frequency and voltage device which also has a relatively low cost to produce. The selected input and modulation frequencies are left to the discretion of the designer, in view of the teachings above. The use of a high frequency transformer arrangement for voltage transformation results in an apparatus to be physically small and lightweight at a given power level relative to a transformer operating at a lower frequency, although as mentioned any suitable transformer arrangement may be used.

Applicant's co-pending application Ser. No. 11/533,548, filed Sep. 20, 2006, is, in its entirety, hereby fully incorporated by reference into this application.

Modifications to what is described herein will be apparent to those skilled in the art. For example, the amplitude modulation signal for the switching circuit 14 may be synthesized digitally. The use of input and output filters is optional. Any suitable modulation patterns may be used, and a variety of output waveforms may be generated. Although a sample resonant converter arrangement is described and depicted, other suitable arrangements are available within the scope of the teachings herein. As well, although this disclosure addresses a single phase system as examples, any number of such circuits can be used together to form multi-phase configurations where required. Accordingly, the above description and accompanying drawings should be taken as illustrative of the invention and not in a limiting sense. It will further be understood that it is intended to cover any variations, uses, or adaptations of the invention following, in general, the principles of the various aspects and including such departures from the present disclosure as come within known or customary practice within the art to which the invention pertains and as may be applied to the essential features herein before set forth, and as follows in the scope of the appended claims.

What is claimed is:

1. A method for conditioning a power signal, the method comprising:
   using a resonant converter to invert an input signal to an intermediate AC signal;
   modulating the intermediate AC signal at a substantially resonant frequency of the resonant converter using an input modulation signal to impart a desired voltage-time function to the intermediate AC signal;
   full-wave rectifying the intermediate AC signal to provide a rectified DC signal, the rectified DC signal having a periodic cyclical voltage-time function;
   periodically reversing a polarity of the rectified DC signal with a fixed duty cycle to thereby produce an output AC signal based on the voltage-time function imparted to the intermediate AC signal; and,
   providing the input modulation signal based on a comparison between feedback from the output AC signal and a reference AC waveform.

2. The method of claim 1 further comprising transforming the intermediate AC signal to a desired voltage level.

3. The method of claim 1 wherein the desired voltage-time function is sinusoidal in nature.

4. The method of claim 1 wherein the input modulation signal is sinusoidal in nature.

5. The method of claim 4 wherein the input modulation signal is a full-wave rectified sine wave.

6. The method of claim 1 wherein reversing the polarity of the rectified DC signal comprises:
   supplying the rectified DC signal to a commutator;
   supplying an appropriate switching signal to the commutator;
   switching the commutator to reverse the polarity of the rectified DC signal every second cycle.

7. The method of claim 1 wherein inverting the input signal to the intermediate AC signal is performed with a push/pull switching circuit.

8. The method of claim 6 wherein the appropriate switching signal is a sinusoidal signal.

9. The method of claim 1, wherein providing the input modulation signal comprises:
   generating a sine wave; and
   rectifying said sine wave to provide a rectified sine wave input modulation signal.

10. The method of claim 1 further comprising filtering the rectified DC signal to remove noise from the rectified DC signal.

11. A power inverter having an output, the power inverter comprising:
    a push-pull resonant switching circuit having a DC input and an intermediate AC output;
    a modulator configured to modulate the intermediate AC output from the push-pull switching circuit at a substantially resonant frequency of the switching circuit to impart a desired voltage-time function to the intermediate AC output;
    a full-wave rectifier having the intermediate AC output as an input and having a full-wave rectified DC output having a periodic cyclical voltage-time function;
    a commutator having the full-wave rectified DC output as an input, the commutator being connected to the power inverter output; and
    a controller configured to cause the commutator to periodically switch a polarity of the full-wave rectified DC output with a fixed duty cycle to thereby provide AC power to the power inverter output based on the voltage-time function imparted to the intermediate AC output, wherein the modulator is configured to modulate the intermediate AC output from the push-pull switching circuit based on a comparison between feedback from the AC power to the power inverter output and a reference AC waveform.

12. The power inverter of claim 11, the switching circuit includes a transformer connected between the modulator and the full-wave rectifier, the transformer configured to step-up transform a voltage of the intermediate AC output.

13. The power inverter of claim 11, wherein said transformer is a high frequency torroidal transformer.

14. The power inverter of claim 11, wherein the modulator comprises a pulse width modulator, a sine wave generator, and a second full-wave rectifier.

15. The power inverter of claim 11, wherein the commutator is a H-bridge commutator.

16. The power inverter of claim 11, wherein the commutator is a silicon-controlled rectifier (SCR) commutator.

17. An inverter comprising:
    a resonant converter configured to invert an input signal to an intermediate AC signal imparted with a desired voltage-time function and modulated at a substantially resonant frequency of the resonant converter based on a modulation signal;
    means for rectifying the intermediate AC signal to provide a rectified DC signal having a periodic cyclical voltage-time function;
    means for periodically reversing a polarity of the rectified DC signal with a fixed duty cycle to thereby produce an output AC signal based on the voltage-time function imparted to the intermediate AC signal; and
    means for providing the modulation signal to the resonant converter based on a comparison of feedback from the output AC signal and a reference AC waveform.

* * * * *